(12) United States Patent
Schmidt et al.

(10) Patent No.: US 11,155,253 B2
(45) Date of Patent: Oct. 26, 2021

(54) ELECTROPNEUMATIC PARKING BRAKE UNIT HAVING A PNEUMATICALLY SWITCHABLE PISTON VALVE

(71) Applicant: WABCO GmbH, Hannover (DE)

(72) Inventors: Thomas Schmidt, Hannover (DE); Julian van Thiel, Hannover (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 0 days.

(21) Appl. No.: 16/375,863

(22) Filed: Apr. 5, 2019

(65) Prior Publication Data

US 2019/0308599 A1 Oct. 10, 2019

(30) Foreign Application Priority Data

Apr. 6, 2018 (DE) ...................... 10 2018 108 202.9

(51) Int. Cl.
*B60T 13/68* (2006.01)
*B60T 7/08* (2006.01)
*B60T 15/04* (2006.01)
*B60T 15/02* (2006.01)
*B60T 13/38* (2006.01)

(52) U.S. Cl.
CPC .............. *B60T 13/683* (2013.01); *B60T 7/08* (2013.01); *B60T 15/027* (2013.01); *B60T 15/041* (2013.01); *B60T 13/38* (2013.01); *B60T 13/385* (2013.01)

(58) Field of Classification Search
CPC ...... B60T 13/683; B60T 13/38; B60T 15/041; B60T 15/027; B60T 7/08; B60T 13/385
See application file for complete search history.

(56) References Cited

U.S. PATENT DOCUMENTS 4,155,603 A * 5/1979 Harries ................. B60T 8/5068
303/118.1
8,833,868 B2 9/2014 Bensch et al.
8,864,245 B2 10/2014 Schnittger et al.
9,157,543 B2 10/2015 Herges
(Continued)

FOREIGN PATENT DOCUMENTS

DE 102008014547 A1 9/2009
DE 102011101438 A1 11/2012
(Continued)

*Primary Examiner* — Melody M Burch

(74) *Attorney, Agent, or Firm* — Leydig, Voit & Mayer, Ltd.

(57) ABSTRACT

An electropneumatic parking brake system for a utility vehicle includes a pilot module configured to control at least a first control pressure. The pilot module has a pilot store connection configured to receive a store pressure from a compressed air device and at least one pilot valve combination. The electropneumatic parking brake system further includes at least one manually actuatable piston valve connected to a valve store connection and having a parking brake connection. The parking brake connection is ventilated in a first switching position of the piston valve and a parking brake pressure at the parking brake connection is controllable in a second switching position of the piston valve. The piston valve has a first pneumatic control connection at which the first control pressure is configured to be controlled in order to pneumatically switch the piston valve.

17 Claims, 3 Drawing Sheets

(56) References Cited

U.S. PATENT DOCUMENTS

| | | | |
|---|---|---|---|
| 2010/0025141 A1 | 2/2010 | Bensch et al. | |
| 2010/0244550 A1* | 9/2010 | Hilberer | B60T 15/041 303/15 |
| 2011/0147141 A1* | 6/2011 | Schnittger | B60T 15/18 188/152 |
| 2011/0303500 A1* | 12/2011 | Hilberer | B60T 17/04 188/170 |
| 2011/0303501 A1* | 12/2011 | Hilberer | B60T 15/18 188/170 |
| 2012/0001477 A1* | 1/2012 | Mederer | B60T 13/683 303/9.76 |

FOREIGN PATENT DOCUMENTS

| | | |
|---|---|---|
| DE | 102015106150 A1 | 10/2016 |
| EP | 1968830 A1 | 9/2008 |
| EP | 2384943 A2 | 11/2011 |
| WO | WO 2007065498 A1 | 6/2007 |

* cited by examiner

ELECTROPNEUMATIC PARKING BRAKE UNIT HAVING A PNEUMATICALLY SWITCHABLE PISTON VALVE

CROSS REFERENCE TO RELATED APPLICATIONS

This application claims benefit to German Patent Application No. DE 10 2018 108 202.9, filed Apr. 6, 2018, which is incorporated by reference herein.

FIELD

The invention relates to an electropneumatic parking brake system for a utility vehicle, having a pilot module for controlling at least a first control pressure, wherein the pilot module has a pilot store connection for receiving a store pressure from a compressed air store, and at least one pilot valve combination; and at least one manually actuatable piston valve which is connected to a valve store connection and which has a parking brake connection, wherein the parking brake connection is ventilated in a first switching position of the piston valve, and wherein in a second switching position of the piston valve a parking brake pressure at the parking brake connection can be controlled.

BACKGROUND

Such electropneumatic parking brake systems are commonly used in the North American region. There is a manually actuatable sliding valve (push-pull valve) via which parking brakes of the utility vehicle can be applied. Parking brakes are generally constructed as spring-loaded brakes which are applied in a spring-loaded manner. In order to release these spring-loaded brakes, a pneumatic pressure which opens a brake piston of the spring-loaded brake counter to the resilient force is required.

By accordingly adjusting the piston valve, the vehicle driver can thus engage or release the parking brakes of the utility vehicle. In utility vehicles which are provided to pull a trailer, there is generally provided a second such piston valve by means of which a corresponding pressure for the trailer can be provided. This pressure for the trailer may be an operating pressure which is controlled by a compressed air store in the utility vehicle and which is provided at the spring mechanisms of the trailer or other parking brakes of the trailer. However, it may also be transferred only as control pressure, in the event that the trailer has a separate compressed air store.

In the context of the increasing automation and electrification of vehicles, however, it is desirable to also replace such a hand-operated valve with electrical or electropneumatic components and in particular to activate them automatically or by means of a signal transmitted from a switch in the driver's cab. In particular, it would also be desirable to be able to activate the parking brakes of the utility vehicle or the trailer electronically in order to be able to use them in the event of a failure or as additional brakes. This is particularly advantageous for autonomous driving. However, the piston valve should still enable conventional operation in order to simplify the operation by the vehicle driver, whereby ultimately also the safety can be further improved since the vehicle driver does not have to learn a new system.

So-called parking brake modules are also known and transfer a control pressure to the trailer control valve (TCV) in order to thus brake the operating brakes of the trailer car in the parked state when spring-loaded brakes of the motor vehicle are activated Such a parking brake module is, for example, known in EP 1 968 830 Bl. The parking brake module disclosed therein controls the pressure of the spring-loaded brakes of the motor vehicle via a connection to the trailer control valve in order to activate the operating brakes of the trailer car in conjunction with the spring-loaded brakes of the motor vehicle.

A similar system is known from EP 2 384 943 A2, in which the pressure of the spring-loaded brakes is also transferred. Other systems are also known from DE 10 2011 101 438 A1 and DE 10 2015 106 150 A1.

DE 10 2008 014 547 A1 finally discloses a compressed-air-operated brake system for a vehicle, wherein this brake system has a first compressed air line in which compressed air can be provided with a controllable operating brake pressure. Using the operating brake pressure, diaphragm portions of brake cylinders can be aerated for an operating brake function of this vehicle. The brake system has a parking brake device with a second compressed air line, wherein in this second compressed air line by means of this parking brake device compressed air can be provided with an electropneumatically controllable parking brake pressure, by means of which spring mechanism components of brake cylinders, in particular of combined spring mechanism/diaphragm brake cylinders which comprise the diaphragm components, can be aerated in order to provide a parking brake function of this vehicle. The parking brake device further has an aeration input via which the second compressed air line can be aerated with compressed air in order to increase the parking brake pressure and the parking brake device has a first ventilation output via which this second compressed air line can be ventilated in order to reduce this parking brake pressure. The second compressed air line can be pneumatically connected via the first ventilation output to the first compressed air line.

SUMMARY

In an embodiment, the present invention provides an electropneumatic parking brake system for a utility vehicle. The electropneumatic parking brake system includes a pilot module configured to control at least a first control pressure. The pilot module has a pilot store connection configured to receive a store pressure from a compressed air device and at least one pilot valve combination. The electropneumatic parking brake system further includes at least one manually actuatable piston valve connected to a valve store connection and having a parking brake connection. The parking brake connection is ventilated in a first switching position of the piston valve and a parking brake pressure at the parking brake connection is controllable in a second switching position of the piston valve. The piston valve has a first pneumatic control connection at which the first control pressure is configured to be controlled in order to pneumatically switch the piston valve.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
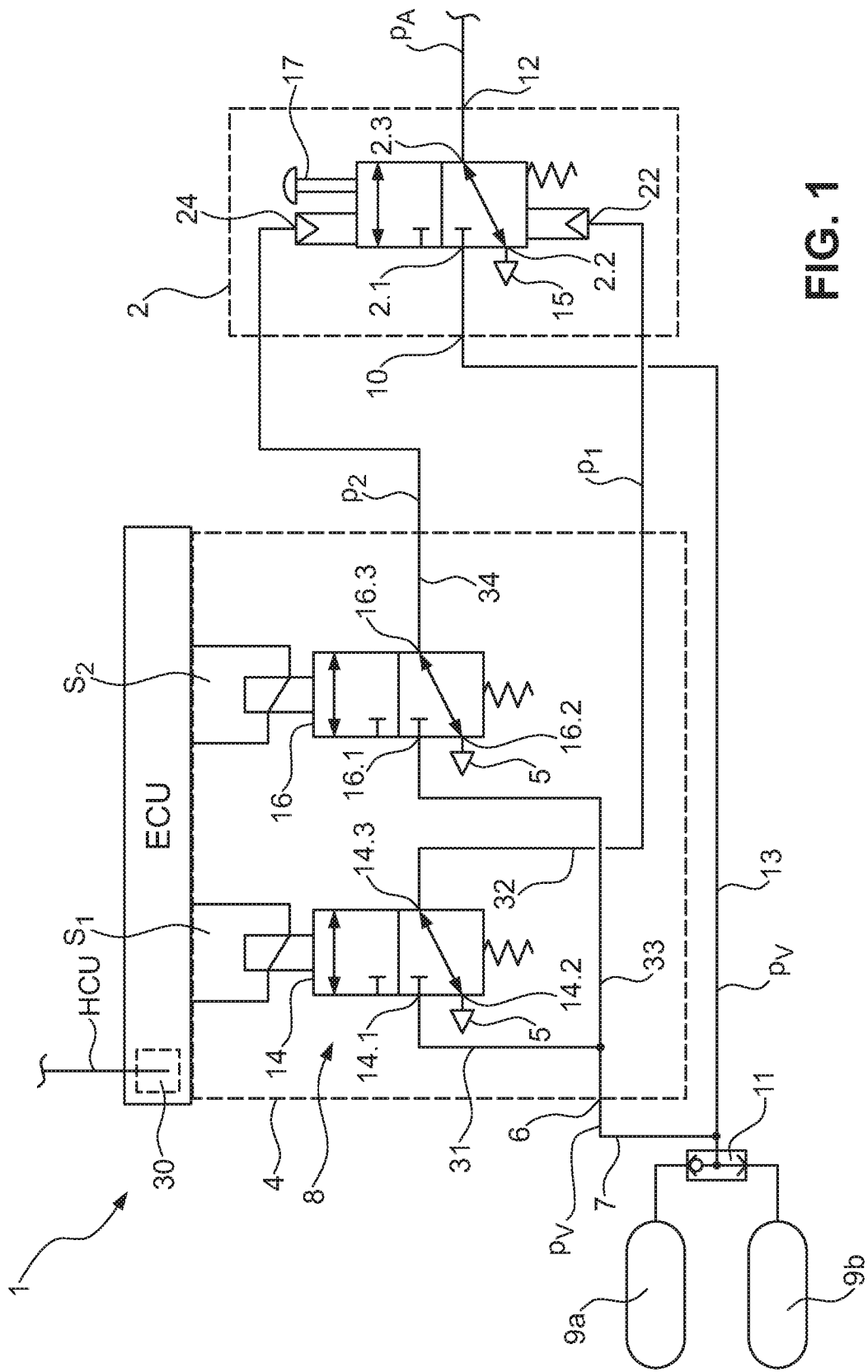
FIG. 1 shows an electropneumatic parking brake system according to a first embodiment of the invention.

Embodiments of the present invention provide electropneumatic parking brake systems for utility vehicles that enable both a manual and an electronically controlled engagement or release of parking brakes of the utility vehicle and preferably of the trailer.

According to an embodiment of the invention, an electropneumatic parking brake system of the type mentioned in the introduction is provided in which the piston valve has at least a first pneumatic control connection at which the first control pressure can be controlled in order to pneumatically switch the piston valve.

Embodiments of the invention improve upon conventional systems by the piston valve additionally being constructed so as to be able to be pneumatically switched. In addition to purely manual actuation of the piston valve, it can thus be pneumatically switched by means of at least the first control pressure in order to control a parking brake pressure at the parking brake connection.

This parking brake pressure may be a store pressure for a trailer or also in specific embodiments a control pressure for the trailer or an operating pressure for the spring mechanism of the utility vehicle (in this instance, in particular of the motor vehicle). In specific embodiments, the parking brake connection may constitute a store connection for the trailer, or a control connection which is provided especially for parking brakes of the trailer.

The first control pressure is provided by the pilot module. The pilot module has the at least one pilot valve combination which can preferably be electrically switched and is preferably electromagnetically constructed. The first control pressure controlled by the pilot module may be a first control pressure provided especially for the piston valve or also a control pressure of a superordinate unit, such as, for example, a superordinate parking brake device for the utility vehicle. It is also conceivable and preferable for the pilot module to be integrated in a superordinate module, for example, an electropneumatic parking brake module for the utility vehicle, or to be connected thereto.

In a variant, it is conceivable for the piston valve to be able to be switched back and forth only on the basis of the first control pressure pneumatically between the first and second switching position. However, it is also preferable for the pilot module to be constructed to control a second control pressure and for the piston valve to have at least a second pneumatic control connection at which the second control pressure can be controlled in order to pneumatically switch the piston valve.

In this context, it is preferable, when the first control pressure exceeds a first predetermined threshold value, for the piston valve to be in the first switching position or switched into this position. In the same manner, it is preferable, when the second control pressure exceeds a second predetermined threshold value, for the piston valve to be in the second switching position or to be switched into that position. In this instance, it should be understood that the terms "first" and "second" are selected only by way of example and based on the first control pressure switching can be carried out into the second switching position and based on the second control pressure switching can be carried out into the first switching position. The technical content of the invention is not changed thereby.

Piston valves as already used in the prior art are bistable. That is to say, when a vehicle driver has manually moved the piston valve, for example, into the first switching position, the piston valve remains in this first switching position. The same also applies to the second switching position. When the vehicle driver has moved the piston valve manually into the second switching position, it remains in the second switching position. The piston valve which is used in the context of this disclosure is also preferably bistable. This means that the first and/or second control pressure after switching the piston valve can be cancelled again without the piston valve falling independently back into the previous switching state. In specific terms, this means that in the above-mentioned example, when the first control pressure has exceeded the first predetermined threshold value, the piston valve switches into the first switching position. If this has been completed, the first control pressure can be cancelled again and the piston valve nonetheless remains in the first switching position. If the second control pressure then exceeds the second predetermined threshold value, the piston valve switches into the second switching position. This control pressure can also be cancelled again after switching without the switching position of the piston valve changing. It is thereby possible for a control pressure not to have to be permanently applied in order to retain the piston valve in one of the first or second switching positions. This is particularly advantageous for normal travel operation when the parking brakes of the utility vehicle (including trailer) are intended to be released, that is to say, aerated.

As also already known with piston valves in the prior art, the piston valve has in the context of this disclosure preferably a manually actuatable manual lever by means of which the piston valve can be manually switched between the first and second switching positions. This manual lever is used to enable the piston valve to be manually switched by the vehicle driver thereof back and forth between the first and second switching positions in order to either manually release the parking brakes or to apply them, for example, when the utility vehicle is parked. This manual lever should also in the context of the present disclosure not be omitted, even when the piston valve is constructed to be pneumatically switchable. The vehicle driver should still be in a position to actuate the piston valve in the manner to which he is accustomed. Only for additionally electronic engagement or release of parking brakes of the utility vehicle are the first and/or second control pressures preferably controlled in order to switch the piston valve in this instance then based on the first and/or the second control pressure.

In order to control the first control pressure, the ventilation valve preferably has a first ventilation valve connection which is connected to the pilot store connection, a second ventilation valve connection which is connected to a ventilation and a third ventilation valve connection which is connected to the first pneumatic control connection. The ventilation valve is according preferably constructed as a 3/2-way valve, wherein the third ventilation valve connection is alternately connected to either the first ventilation valve connection or the second ventilation valve connection. In a powerless state, the third ventilation valve connection is preferably connected to the second ventilation valve connection so that the third ventilation valve connection is ventilated.

In a corresponding manner, the aeration valve is preferably also constructed as a 3/2-way valve and has a first aeration valve connection which is connected to the pilot store connection, a second aeration valve connection which is connected to a ventilation and a third pneumatic valve connection which is connected to the second pneumatic control connection. In this instance, the third aeration valve connection is again preferably alternately connected to either the first aeration valve connection or the second aeration valve connection. Preferably in a powerless switching position of the aeration valve, the third aeration valve connection is connected to the second aeration valve connection so that, in the powerless state, the third aeration valve connection is ventilated.

Preferably, the manually actuatable piston valve and the pilot module are integrated in a common module housing. The structural space can thereby be reduced and the unit can be assembled as a module. Preferably, the module housing then has a main store connection which supplies both the pilot store connection and the piston valve store connection.

In another embodiment, the electropneumatic parking brake system is provided for utility vehicles which are constructed to pull a trailer. In this instance, the piston valve described above is provided together with the pilot valve combination for the utility vehicle (in this instance, the motor vehicle). For the trailer, the electropneumatic parking brake system then preferably has a manually actuatable trailer piston valve which is connected to the valve store connection and which has a trailer parking brake connection, wherein the trailer parking brake connection is ventilated in a first switching position of the trailer piston valve, and wherein, in a second switching position of the trailer piston valve, a trailer parking brake pressure can be controlled at the trailer parking brake connection. On the whole, the above-described variant is thus duplicated with only one piston valve. The trailer piston valve is preferably constructed identically or in a similar manner to the previously described piston valve so that reference may be made entirely to the above description.

In this variant for motor vehicle trailer combinations, there is further preferably provision for the pilot module to have a trailer pilot valve combination for controlling a third and fourth control pressure. The trailer piston valve then has a first pneumatic trailer control connection and a second pneumatic trailer control connection, wherein, at the first pneumatic trailer control connection, the third control pressure and, at the second pneumatic trailer control connection, the fourth control pressure can be controlled in order to pneumatically switch the piston valve.

In another preferred embodiment, the pilot module has an electronic control unit for providing at least a first switching signal at the pilot valve combination. The electronic control unit may be an electronic control unit which is provided separately for the pilot module or a superordinate control unit, for example, an electropneumatic parking brake device, of a trailer control valve of a central module or the like. The electronic control unit may be configured to independently establish the first switching signal in order to provide this at the pilot valve combination.

Preferably, the electronic control unit has to this end an electronic interface for receiving a parking brake signal, wherein the electronic control unit is configured to provide at least the first switching signal based on the parking brake signal. Such a parking brake signal may, on the one hand, for example, be an electronic parking brake signal of a manual switch in the cab of the utility vehicle. On the other hand, the parking brake signal may also be an electronic signal of a superordinate control unit, for example, for autonomous driving. In the first case, it is possible for the vehicle driver to engage or release the parking brakes of the utility vehicle and/or trailer not only manually on the piston valve, but also from the vehicle cab via an electronic switch, as is often the case with European vehicles. In the second case mentioned, the parking brake signal is provided by a superordinate control unit. It is thus possible, for example, for such a parking brake signal to be provided by an electropneumatic parking brake device, which is provided for the utility vehicle. Furthermore, it is conceivable for such a parking brake signal to be provided by a superordinate control unit for autonomous driving which, for example, in specific driving situations, uses the parking brakes of the utility vehicle and/or trailer as additional brakes. Based on this parking brake signal, the electronic control unit establishes at least the first switching signal.

Preferably, the electronic control unit also establishes a second switching signal which is provided at the pilot valve combination. Whilst the first switching signal is preferably provided for the ventilation valve, the second switching signal is preferably provided for the aeration valve. In the event that the ventilation valve and the aeration valve are not constructed as a 3/2-way valve, but instead as a combination of two 2/2-way valves, preferably a total of four switching signals are produced, wherein two switching signals are provided for the 2/2-way valve combination and form the aeration system and two switching signals are provided for the 2/2-way valve combination and form the aeration valve.

It is also possible for these signals to be provided directly via the electronic interface so that the electronic control unit does not independently establish these signals.

An electropneumatic parking brake system 1 of the first embodiment (FIG. 1) has a manually actuatable piston valve 2 and a pilot module 4. The pilot module 4 is shown in this instance as an individual component, which is independent of the piston valve 2. These two elements may be arranged so as to be distributed in a utility vehicle (towing vehicle and/or trailer). The piston valve 2 is generally arranged in the driver's cab of a utility vehicle or on the trailer whilst the pilot module 4 can also be arranged at that location, but may also be installed in combination with other control modules in the towing vehicle or on the trailer The pilot module 4 has a pilot store connection 6 via which the pilot module 4 is connected to a compressed air store 9a, 9b. The compressed air store 9a, 9b (in this instance, illustrated by a first compressed air container 9a and a second compressed air container 9b) can also be provided for other pneumatic modules or operating brakes of the utility vehicle and provides a store pressure pV.

On the other hand, the piston valve 2 is also connected by means of a piston valve store connection 10 to the compressed air store 9a, 9b and is supplied thereby with the store pressure pV. In other embodiments, the piston valve 2 may also be connected to a separate compressed air store (not shown in this instance). In the embodiment shown in FIG. 1, the first compressed air store 9a and the second compressed air store 9b which is separate therefrom are connected to each other by means of a shuttle valve 11 and the shuttle valve 11 opens in a common first store pressure line 7 which extends to the pilot store connection 6 and a second store pressure line 13 which extends to the piston valve store connection 10.

On the other hand, the piston valve 2 is connected to a parking brake connection 12, on which the piston valve 2 can control a parking brake pressure pA. In this embodiment, the parking brake pressure pA is an operating pressure which can be supplied directly to one or more parking brakes of the utility vehicle or trailer. Such parking brakes are generally constructed as so-called spring-loaded brakes and have a resilient portion and a diaphragm portion. The spring of the spring-loaded brakes applies the brakes in the ventilated state so that the spring-loaded brakes have to be aerated in order to be moved into a released state. That is to say, during conventional travel operation, the parking brake pressure pA is controlled at the parking brake connection 12 in order to release the parking brakes of the trailer or in the motor vehicle.

In order to implement this, the piston valve 2 is in this embodiment constructed as a 3/2-way valve and has a first piston valve connection 2.1, a second piston valve connection 2.2 and a third piston valve connection 2.3. The third piston valve connection 2.3 is connected to the parking brake connection 12. The first piston valve connection 2.1 is connected to the second store pressure line 13. The second piston valve connection 2.2 is connected to a ventilation 15 of the piston valve 2. As a result of the construction of the piston valve 2, in a first switching position shown in FIG. 1 the second piston valve connection 2.2 is connected to the third piston valve connection 2.3 so that the parking brake connection 12 is ventilated. In a second switching position of the piston valve 2 not shown in FIG. 1, the first piston valve connection 2.1 is connected to the third piston valve connection 2.3 so that the store pressure pV is controlled directly and in an unamplified manner at the third piston valve connection 2.3 and consequently is controlled at the parking brake connection 12 as a parking brake pressure pA. This parking brake pressure pA can then depending on the installation and circuitry of the piston valve 2 in the utility vehicle be used for parking brakes of the utility vehicle or motor vehicle, or also a trailer.

As already known in the prior art, the piston valve 2 has a manual lever 17 in order to move the piston valve 2 manually between the first switching position shown in FIG. 1 and the second switching position not shown in FIG. 1. The piston valve 2 is on the whole constructed in a bistable manner, that is to say, when the vehicle driver activates the manual lever 17 and pulls the piston valve 2 into the first switching position shown in FIG. 1, the piston valve 2 remains in this switching position without independently falling into the second switching position. The same also applies when the vehicle driver moves the piston valve 2 into the second switching position not shown in FIG. 1. The piston valve 2 also remains in this switching position without falling back into the first switching position.

The electropneumatic pilot module 4 serves to be able to operate the piston valve 2 not only manually, but in particular also based on electronic parking brake signals HCU, which are provided at an electronic control unit (ECU) of the pilot module 4, more specifically at an electronic interface 30 of the electronic control unit ECU.

To this end, the pilot module 4 has at least one pilot valve combination 8. The pilot valve combination 8 has in this embodiment (FIG. 1) a ventilation valve 14 for providing a first control pressure p1 and an aeration valve 16 for providing a second control pressure p2.

More specifically, the ventilation valve 14 is constructed as a 3/2-way valve and has a first ventilation valve connection 14.1, a second ventilation valve connection 14.2 and a third ventilation valve connection 14.3. The first ventilation valve connection 14.1 is connected via a third store pressure line 31 to the pilot store connection 6. The second ventilation valve connection 14.2 is connected to a ventilation 5 which can be constructed as a central ventilation of the pilot module 4. The third ventilation valve connection 14.3 in contrast is connected to a first pneumatic control line 32, in which the first control pressure p1 can be controlled. The first control line 32 extends in the embodiment shown (FIG. 1) from the pilot module 4 and to a first pneumatic control connection 22 of the piston valve 2. It should be understood that in the first pneumatic control line 32 one or more connections may also be provided, such as in particular a connection to a housing of the pilot module 4. This is required particularly when the individual modules (the pilot module 4 and the piston valve 2) are installed separately and only then wired in the utility vehicle.

The aeration valve 16 is also constructed as a 3/2-way valve and has a first aeration valve connection 16.1, a second aeration valve connection 16.2 and a third aeration valve connection 16.3. The first aeration valve connection 16.1 is connected by means of a fourth store pressure line 33 to the pilot store connection 6 so that the store pressure pV is also controlled therein. The second aeration valve connection 16.2 is connected to a ventilation 5 or the ventilation 5 which in turn may be the central ventilation of the pilot module 4. The third aeration valve connection 16.3 is connected to a second pneumatic control line 34 in which the second control pressure p2 is controlled. This second pneumatic control line 34 may also be provided with one or more connections. The second pneumatic control line 34 extends to a second pneumatic control connection 24 of the piston valve 2.

Both the ventilation valve 14 and the aeration valve 16 are powerless in their first switching positions shown in FIG. 1, in which the third ventilation valve connection 14.3 is connected to the second ventilation valve connection 14.2 and the third aeration valve connection 16.3 is connected to the second aeration valve connection 16.2 Both the first and the second control line 32, 34 are thus ventilated.

In order to now move the piston valve 2, for example, from the first switching position shown in FIG. 1 to the second switching position not shown in FIG. 1, in this embodiment the switching of the aeration valve 16 is required. To this end, there is provided by the electronic control unit ECU the second switching signal S2 which brings about the switching of the aeration valve 16. The aeration valve 16 switches into the second switching position which is not shown in FIG. 1 and in which the first aeration valve connection 16.1 is connected to the third aeration valve connection 16.3 and the second control pressure p2 is controlled. The second control pressure p2 is provided via the second control line 34 on the second pneumatic control connection 24. If the second control pressure p2 at this second control connection 24 exceeds the second predetermined threshold value of the piston valve 2, the piston valve 2 switches in a pneumatically controlled manner, without additional manual actuation of the manual lever 17, into the second switching position not shown in FIG. 1. In the second switching position not shown in FIG. 1, the first piston valve connection 2.1 is connected to the third piston valve connection 2.3 so that the parking brake pressure pA is controlled and the parking brakes (depending on the circuitry of the utility vehicle or motor vehicle or trailer) are consequently released. Since the piston valve 2 is preferably constructed in a bistable manner, the aeration valve 16 can after switching the piston valve 2 be switched into a powerless state again and can fall back into the switching position which is shown in FIG. 1 and in which the second control line 34 and consequently also the second pneumatic control connection 24 are ventilated. Therefore, it is sufficient for the second switching signal S2 to be provided only briefly. The parking brake pressure pA continues to remain permanently controlled and the parking brakes remain released.

If, in the reverse case, the parking brakes are now intended to be engaged, for example, since the utility vehicle is parked, the ventilation valve 14 has to be switched. The piston valve 2 is in the second switching position not shown in FIG. 1 when the parking brakes are released. If the first switching signal S1 is now controlled by the electronic control unit ECU, the ventilation valve 14 switches into the second switching position which is not shown in FIG. 1 and in which the first ventilation valve connection 14.1 is connected to the third ventilation valve connection 14.3. The first control pressure p1 is controlled in the first pneumatic control line 32 and provided thereby to the first pneumatic control connection 22. As soon as the first control pressure p1 exceeds the predetermined first threshold value, the piston valve 2 switches into the first switching position shown in FIG. 1 without the actuation of the manual lever 17 being additionally required. The third piston valve connection 23 is connected to the second piston valve connection 2.2 so that the parking brake connection 12 is ventilated. The parking brakes are engaged.

The electronic control unit ECU has in this embodiment (FIG. 1) an electronic interface 30 which, for example, may be constructed as a CAN bus interface. The electronic interface 30 may, however, also be constructed as an internal interface with respect to another electronic control unit of a subordinate or superordinate module. Via the electronic interface 30, the electronic control unit ECU receives parking brake signals HCU which request the actuation of the parking brakes. Such a parking brake signal HCU may, for example, originate from a parking brake switch in the driver's cab of the utility vehicle or from a superordinate unit such as, for example, a unit for autonomous driving. Based on the parking brake signal HCU received, the electronic control unit ECU then establishes the first and second switching signals S1, S2 which can also be transmitted briefly one after the other and alternately in order to achieve a brief or staggered engagement of parking brakes.

Figure 2:
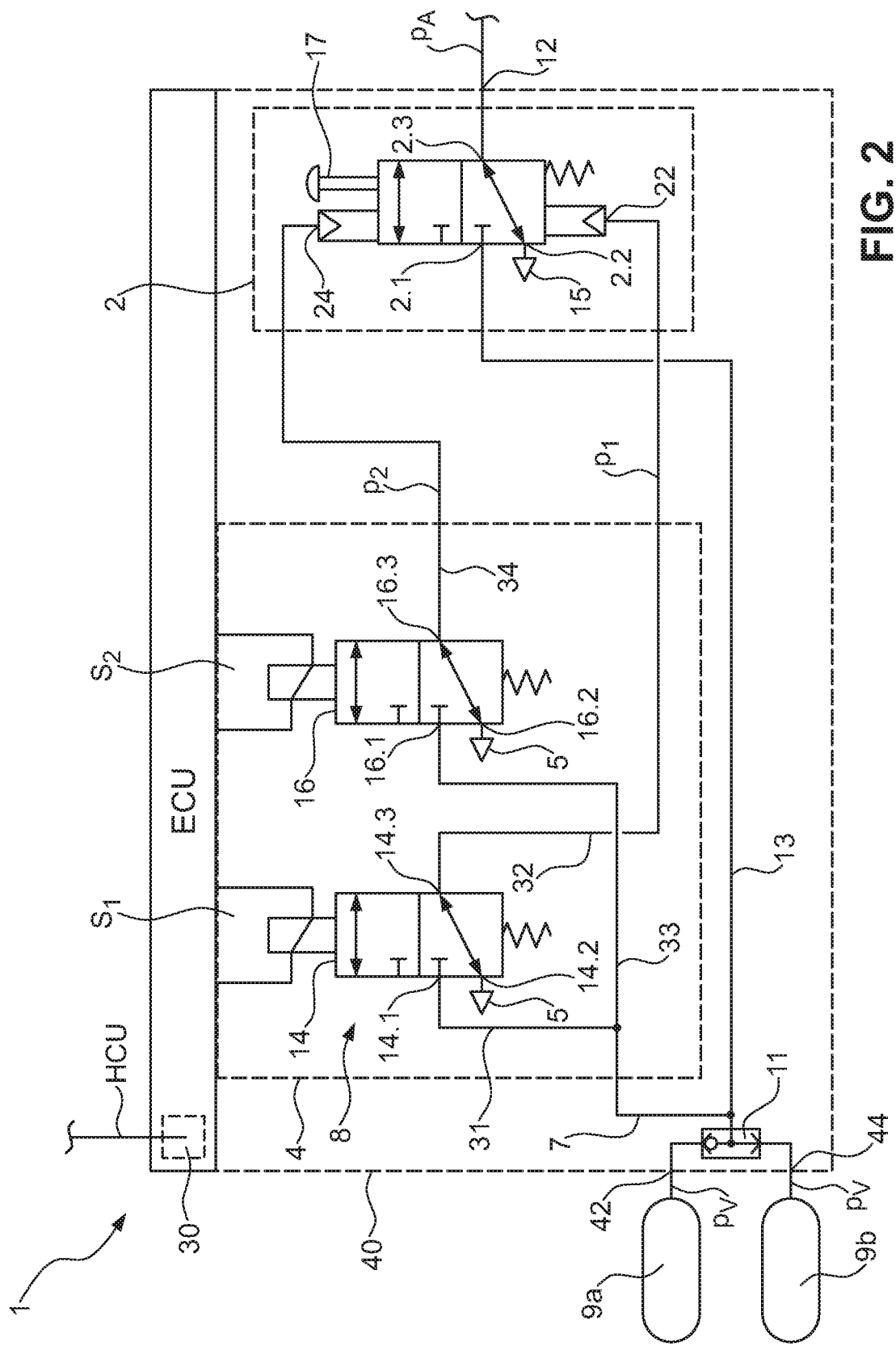
FIG. 2 shows an electropneumatic parking brake system according to a second embodiment of the invention.
Figure 3:
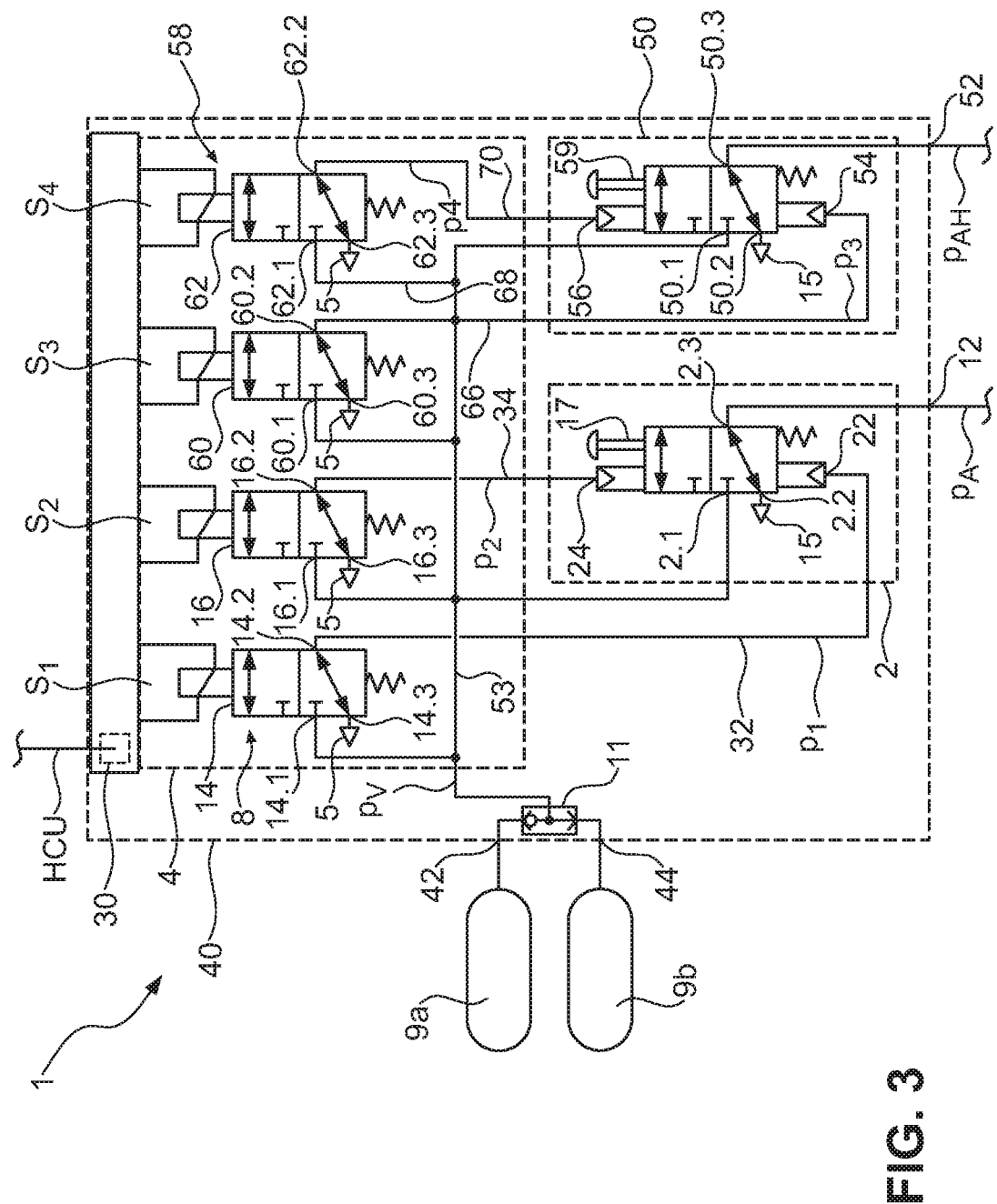
FIG. 3 shows an electropneumatic parking brake system according to a third embodiment of the invention.

FIGS. 2 and 3 show other embodiments, wherein identical elements are provided with the same reference numerals as FIG. 1. In this regard, reference may be made entirely to the above description relating to FIG. 1. In particular the differences with respect to the first embodiment (FIG. 1) are emphasized below.

According to FIG. 2, the pilot module 4 and the piston valve 2 are integrated in a common module housing 40. In FIG. 2, the pilot module 4 and the piston valve 2 are further surrounded with dashed lines which, however, in this embodiment, do not necessarily indicate housing portions, but instead depict only functional system limits.

In this embodiment (FIG. 2), the shuttle valve 11 is also integrated in the common module housing 40. The common module housing 40 has a first module store connection 42 and a second module store connection 44. The first Compressed air store 9a is connected to the first module store connection 42 and the second compressed air store 9b is connected to the second module store connection 44. The pilot store connection 6 and the piston valve store connection 10 can consequently be dispensed with. This embodiment is particularly suitable for utility vehicles which are not provided for pulling a trailer, so-called rigid configurations. The parking brake pressure pA is in this instance then provided for the parking brakes of the utility vehicle. The advantage of this embodiment is in particular that the electropneumatic parking brake system 1 can be installed as a module inside the utility vehicle. FIG. 3 now shows a variant which is provided for a utility vehicle which is constructed to pull trailers. The electropneumatic parking brake system 1 according to this third embodiment is then in contrast to the previous embodiments (FIGS. 1 and 2) constructed not only to control the parking brake pressure pA but also a trailer parking brake pressure pAH. To this end, the arrangement comprising the piston valve 2 and pilot valve combination 8 is doubled.

In detail, the electropneumatic parking brake system 1 has according to this third embodiment a manually actuatable trailer piston valve 50 which is constructed in accordance with the piston valve 2. In this specific embodiment, the piston valve 2 may also be referred to as a motor vehicle piston valve since the parking brake pressure pA is preferably used for the motor vehicle of a towing vehicle/trailer combination.

The trailer piston valve 50 provides a trailer parking brake pressure pAH at a trailer parking brake connection 52.

In order to implement this, the trailer piston valve 50 is in this embodiment (FIG. 3) constructed as a 3/2-way valve and has a first trailer piston valve connection 50.1, a second trailer piston valve connection 50.2 and a third trailer piston valve connection 50.3. The third trailer piston valve connection 50.3 is connected to the trailer parking brake connection 52. The first trailer piston valve connection 50.1 is connected to a store distribution line 53. The second trailer piston valve connection 50.2 is connected to a ventilation 15 of the trailer piston valve 50. As a result of the construction of the trailer piston valve 50 which is identical to the construction of the piston valve 2, in a first switching position shown in FIG. 3 the second trailer piston valve connection 50.2 is connected to the third trailer piston valve connection 50.3 so that the trailer parking brake connection 52 is ventilated. In a second switching position of the trailer piston valve 50 not shown in FIG. 3, the first trailer piston valve connection 50.1 is connected to the third trailer piston valve connection 50.3 so that the store pressure pV is controlled directly in a non-amplified manner at the third trailer piston valve connection 50.3 and consequently at the trailer parking brake connection 52 as a trailer parking brake pressure pAH.

As already described with reference to the piston valve 2, the trailer piston valve 50 also has a manual lever 59 in order to move the piston valve 2 manually between the first switching position shown in FIG. 3 and the second switching position shown in FIG. 3. The trailer piston valve 50 is on the whole constructed in a bistable manner, that is to say, when the vehicle driver activates the manual lever 59 and pulls the trailer piston valve 50 into the first switching position shown in FIG. 3, the trailer piston valve 50 remains in this switching position without falling independently into the second switching position. The same also applies when the vehicle driver moves the trailer piston valve 50 into the second switching position not shown in FIG. 3. The trailer piston valve 50 also remains in this switching position without falling back into the first switching position.

The electropneumatic pilot module 4 serves to also switch the trailer piston valve 50 based on electronic parking brake signals HCU which are provided at the electronic interface 30 of the electronic control unit ECU. To this end, the pilot module 4 has a trailer pilot valve combination 58. The trailer pilot valve combination 58 has in this embodiment (FIG. 3) a trailer ventilation valve 60 for providing a third control pressure p3 and a trailer aeration valve 62 for providing a fourth control pressure p4.

More specifically, the trailer ventilation valve 60 is constructed as a 3/2-way valve and has a first trailer ventilation valve connection 60.1, a second trailer ventilation valve connection 60.2 and a third trailer ventilation valve connection 60.3. The first trailer ventilation valve connection 60.1 is connected by means of a first store branch line 64 to the store distribution line 53 and consequently ultimately to the shuttle valve 11. The second trailer ventilation valve connection 60.2 is connected to a ventilation 5 which may be constructed as a central ventilation of the pilot module 4. The third trailer ventilation valve connection 60.3 in contrast is connected to a third pneumatic control line 66 in which the third control pressure p3 can be controlled. The third control line 66 extends in the embodiment shown (FIG. 3) from the pilot module 4 and to a first pneumatic trailer control connection 54 of the trailer piston valve 50.

The trailer aeration valve 62 is also constructed as a 3/2-way valve and has a first trailer aeration valve connection 62.1, a second trailer aeration valve connection 62.2 and a third trailer aeration valve connection 62.3. The first trailer aeration valve connection 62.1 is connected via a second store branch line 68 to the store distribution line 53 so that the store pressure pV is also controlled therein. The second trailer aeration valve connection 62.2 is connected to a ventilation 5 or the ventilation 5 which in turn may be the central ventilation of the pilot module 4. The third trailer aeration valve connection 62.3 is connected to a fourth pneumatic control line 70, in which the fourth control pressure p4 is controlled.

Both the trailer ventilation valve 60 and the trailer aeration valve 62 are powerless in the first switching positions thereof which are shown in FIG. 3 and in which the third trailer ventilation valve connection 60.3 is connected to the second trailer ventilation valve connection 60.2 and the third trailer aeration valve connection 62.3 is connected to the second trailer aeration valve connection 62.2. Both the third and the fourth control line 66, 70 are thus ventilated.

In order to now move the trailer piston valve 50, for example, from the first switching position shown in FIG. 3 to the second switching position not shown in FIG. 3, in this embodiment the switching of the trailer aeration valve 62 is required. To this end, the electronic control unit ECU provides the fourth switching signal S4 which brings about the switching of the trailer aeration valve 62. The trailer aeration valve 62 switches into the second switching position which is not shown in FIG. 3 and in which the first trailer aeration valve connection 62.1 is connected to the third trailer aeration valve connection 62.3 and the fourth control pressure p4 is controlled. The fourth control pressure p4 is provided via the fourth control line 70 at the second pneumatic trailer control connection 56 of the trailer piston valve 50. If the fourth control pressure p4 exceeds at this second trailer control connection 56 the fourth predetermined threshold value of the trailer piston valve 50, the trailer piston valve 50 switches in a pneumatically controlled manner without additional manual actuation of the manual lever 59 into the second switching position not shown in FIG. 3. In the second switching position not shown in FIG. 3, the first trailer piston valve connection 50.1 is connected to the third trailer piston valve connection 50.3 so that the trailer parking brake pressure pAH is controlled and the parking brakes of the trailer are consequently released. Since the trailer piston valve 50 is preferably constructed in a bistable manner, the trailer aeration valve 62 after switching the trailer piston valve 50 can again be switched into a powerless state and can fall back into the first switching position which is shown in FIG. 3 and in which the fourth control line 70 and consequently also the second pneumatic trailer control connection 56 are ventilated. It is thus sufficient to provide the fourth switching signal S4 only briefly. The trailer parking brake pressure pAH continues to remain permanently controlled and the parking brakes released.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Electropneumatic parking brake system
2 Manually actuatable piston valve
2.1 First piston valve connection
2.2 Second piston valve connection
2.3 Third piston valve connection
4 Pilot module
5 Ventilation
6 Pilot store connection
7 First store pressure line
8 Pilot valve combination
9a First compressed air store
9b Second compressed air store
10 Piston valve store connection
11 Shuttle valve
12 Trailer parking brake connection
13 Second store pressure line
14 Ventilation valve
14.1 First ventilation valve connection
14.2 Second ventilation valve connection
14.3 Third ventilation valve connection
15 Ventilation of the piston valve
16 Aeration valve
16.1 First aeration valve connection
16.2 Second aeration valve connection
16.3 Third aeration valve connection
17 Manual lever of the piston valve
22 First pneumatic control connection
24 Second pneumatic control connection
30 Electronic interface
31 Third store pressure line
32 First control line 33 Fourth store pressure line
34 Second control line
40 Common module housing
42 First module store connection
44 Second module store connection
50 Manually actuatable trailer piston valve
50.1 First trailer piston valve connection
50.2 Second trailer piston valve connection
50.3 Third trailer piston valve connection
52 Trailer parking brake connection
53 Store distribution line
54 First trailer control connection
56 Second trailer control connection
58 Trailer pilot valve combination
59 Manual lever of the trailer piston valve
60 Trailer ventilation valve
60.1 First trailer ventilation valve connection
60.2 Second trailer ventilation valve connection
60.3 Third trailer ventilation valve connection
62 Trailer aeration valve
62.1 First trailer aeration valve connection
62.2 Second trailer aeration valve connection
62.3 Third trailer aeration valve connection
64 First store branch line
66 Third pneumatic control line
68 Second store branch line
70 Fourth pneumatic control line
ECU Electronic control unit
HCU Parking brake signal
pA Parking brake pressure
pAH Trailer parking brake pressure
pV Store pressure
p1 First control pressure
p2 Second control pressure
p3 Third control pressure
p4 Fourth control pressure
S1 First switching signal
S2 Second switching signal
S3 Third switching signal
S4 Fourth switching signal

What is claimed is:

1. An electropneumatic parking brake system for a utility vehicle, the electropneumatic parking brake system comprising:
a pilot module configured to control at least a first control pressure, the pilot module having a pilot store connection configured to receive a store pressure from a compressed air device and at least one pilot valve combination;
at least one manually actuatable piston valve connected to a valve store connection and having a parking brake connection, the parking brake connection being ventilated in a first switching position of the at least one manually actuatable piston valve and a parking brake pressure at the parking brake connection being controllable in a second switching position of the at least one manually actuatable piston valve; and
a manually actuatable trailer piston valve connected to the valve store connection and which has a trailer parking brake connection, wherein the trailer parking brake connection is ventilated in a first switching position of the manually actuatable trailer piston valve, and in a second switching position of the manually actuatable trailer piston valve, a trailer parking brake pressure being controllable at the trailer parking brake connection,
wherein the at least one manually actuatable piston valve has a first pneumatic control connection at which the first control pressure is configured to be controlled in order to pneumatically switch the at least one manually actuatable piston valve,
wherein the pilot module has a trailer pilot valve combination configured to control a third and fourth control pressure,
wherein the manually actuatable trailer piston valve has a first pneumatic trailer control connection and a second pneumatic trailer control connection, and
wherein at the first pneumatic trailer control connection, the third control pressure is controllable and at the second pneumatic trailer control connection, the fourth control pressure is controllable in order to pneumatically switch the manually actuatable trailer piston valve.

2. The electropneumatic parking brake system of claim 1, wherein the pilot module is constructed to control a second control pressure, and wherein the at least one manually actuatable piston valve has a second pneumatic control connection, at which the second control pressure is configured to be controlled in order to pneumatically switch the piston valve.

3. The electropneumatic parking brake system of claim 1, wherein, when the first control pressure exceeds a first predetermined threshold value, the at least one manually actuatable piston valve is in the first switching position or is switched into the first switching position.

4. The electropneumatic parking brake system of claim 2, wherein, when the second control pressure exceeds a second predetermined threshold value, the at least one manually actuatable piston valve is in the second switching position or is switched into the second switching position.

5. The electropneumatic parking brake system of claim 1, wherein the at least one manually actuatable piston valve has a manually actuatable manual lever configured to manually switch the at least one manually actuatable piston valve between the first and second switching positions.

6. The electropneumatic parking brake system of claim 1, wherein the at least one manually actuatable piston valve and the pilot module are integrated in a common module housing.

7. The electropneumatic parking brake system of claim 2, wherein the pilot valve combination has a ventilation valve configured to provide the first control pressure and an aeration valve configured to provide the second control pressure.

8. The electropneumatic parking brake system of claim 7, wherein the ventilation valve has a first ventilation valve connection connected to the pilot store connection, a second ventilation valve connection connected to a ventilation, and a third ventilation valve connection connected to the first pneumatic control connection.

9. The electropneumatic parking brake system of claim 7, wherein the aeration valve has a first aeration valve connection connected to the pilot store connection, a second aeration valve connection connected to a ventilation, and a third aeration valve connection connected to the second pneumatic control connection.

10. The electropneumatic parking brake system of claim 1, wherein the pilot module has an electronic control unit configured to provide at least a first switching signal at the pilot valve combination.

11. The electropneumatic parking brake system of claim 10, wherein the electronic control unit has an electronic interface configured to receive a parking brake signal, and the electronic control unit is configured to provide at least the first switching signal based on the parking brake signal.

12. The electropneumatic parking brake system of claim 10, wherein the electronic control unit is constructed to provide a second switching signal at the pilot valve combination.

13. An electropneumatic parking brake system for a utility vehicle, the electropneumatic parking brake system comprising:
- a pilot module, comprising:
  - a pilot store connection configured to receive a store pressure from a compressed air device,
  - a pilot valve, and
  - a first control pressure line configured to output a first control pressure;
- a manually actuatable piston valve, comprising:
  - an input port connected to a store pressure line,
  - an output port connected to a parking brake pressure line, and
  - a first pneumatic control port connected to the first control pressure line of the pilot module; and
- a manually actuatable trailer piston valve connected to the store pressure line and which has a trailer parking brake connection, wherein the trailer parking brake connection is ventilated in a first switching position of the trailer piston valve, and in a second switching position of the trailer piston valve, a trailer parking brake pressure can be controlled at the trailer parking brake connection,
- wherein the output port of the manually actuatable piston valve is connected to a ventilation of the manually actuatable piston valve in a first switching position of the manually actuatable piston valve,
- wherein the output port of the manually actuatable piston valve is connected to the input port of the manually actuatable piston valve in a second switching position of the manually actuatable piston valve,
- wherein the manually actuatable piston valve is bistable,
- wherein the pilot module has a trailer pilot valve combination configured to control a third and fourth control pressure,
- wherein the trailer piston valve has a first pneumatic trailer control connection and a second pneumatic trailer control connection, and
- wherein at the first pneumatic trailer control connection, the third control pressure can be controlled and at the second pneumatic trailer control connection, the fourth control pressure can be controlled in order to pneumatically switch the trailer piston valve.

14. The electropneumatic parking brake system of claim 13, wherein the pilot valve is configured to, in a first switching position, shut off the first control pressure line from a store pressure line, and
wherein the pilot valve is configured to, in a second switching position, connect the first control pressure line to the store pressure line so as to provide the first control pressure to the first pneumatic control port of the manually actuatable piston valve.

15. The electropneumatic parking brake system of claim 14, wherein the first control pressure provided by the first pressure control line of the pilot module is configured to:
- pneumatically bias the manually actuatable piston valve towards the second switching position from the first switching position; or
- pneumatically bias the manually actuatable piston valve towards the first switching position from the second switching position.

16. The electropneumatic parking brake system of claim 14, the pilot module further comprising a second control pressure line configured to output a second control pressure, and
the manually actuatable piston valve further comprising a second pneumatic control port connected to the second control pressure line of the pilot module.

17. The electropneumatic parking brake system of claim 16, the pilot module further comprising a second pilot valve,
wherein the second pilot valve is configured to, in a first switching position, shut off the second control pressure line from a third store pressure line, and
wherein the second pilot valve is configured to, in a second switching position, connect the second control pressure line to a third store pressure line so as to provide a second control pressure to the second pneumatic control port of the manually actuatable piston valve.

* * * * *